US006584793B2

(12) United States Patent
Fukushima et al.

(10) Patent No.: US 6,584,793 B2
(45) Date of Patent: Jul. 1, 2003

(54) COGENERATION SYSTEM

(75) Inventors: Toshihiko Fukushima, Tsuchiura (JP); Tadakatsu Nakajima, Chiyoda (JP); Masaaki Ito, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/059,329

(22) Filed: Jan. 31, 2002

(65) Prior Publication Data

US 2003/0051496 A1 Mar. 20, 2003

(30) Foreign Application Priority Data

Aug. 31, 2001 (JP) .................................... 2001-262640

(51) Int. Cl.⁷ .......................... F25B 27/00; F02C 7/00
(52) U.S. Cl. .................... 62/238.3; 60/728; 60/783; 62/434
(58) Field of Search .................... 62/238.3, 434; 60/728, 783, 655, 648

(56) References Cited

U.S. PATENT DOCUMENTS 6,318,065 B1 * 11/2001 Pierson ..................... 60/783

FOREIGN PATENT DOCUMENTS

JP 04251170 A * 9/1992

* cited by examiner

Primary Examiner—Chen-Wen Jiang

(57) ABSTRACT

A cogeneration system in which cold is generated by recovering exhaust heat of a gas turbine for driving a generator to drive a refrigerating machine, and the cold is used for cooling intake air for the gas turbine and as a cold heat source for an air conditioner, wherein there are provided a thermal storage tank for storing the cold generated by the refrigerating machine and an electric energy storage equipment for storing electric energy generated by the generator; and cooling of the intake air for the gas turbine, thermal storage, and electric energy storage are controlled in relation to the load of the air conditioner and the electric power load of the generator.

14 Claims, 11 Drawing Sheets

⟵ HEAT STORAGE
⟵--- HEAT DISSIPATION
⟵ LOAD CIRCULATION

⟵ HEAT STORAGE
⟵---- HEAT DISSIPATION
⟵ LOAD CIRCULATION

COGENERATION SYSTEM

BACKGROUND OF THE INVENTION

The present invention relates to a cogeneration system and, more particularly, to a cogeneration system in which electric power is generated by a gas turbine generator, and at the same time, exhaust heat of the gas turbine generator is recovered to drive a heat-driven refrigerating machine so as to be used for cooling intake air of the gas turbine and as a cold source for an air conditioner.

Hitherto, in order to more effectively recover and store exhaust heat energy of a steam turbine generator as a cogeneration system, it is known to provide an absorption refrigerating machine driven by steam discharged from the steam turbine generator and an intake air cooler for cooling intake air for a gas turbine by using chilled water generated by the absorption refrigerating machine in combination with a gas turbine generator for generating electric power by using gas of fuel (liquid or gas fuel), an exhaust gas boiler for generating steam by exhaust gas from the gas turbine generator, a steam turbine generator driven by steam of the exhaust gas boiler, an ammonia absorption refrigerating machine driven by steam discharged from the steam turbine generator and a thermal storage tank housing a freezable thermal storage medium for storing cold of the ammonia absorption refrigerating machine. Such a cogeneration system is disclosed in, for example, JP-A-2001-50012.

In the prior art cogeneration systems, if an output of the gas turbine is increased in response to increment of the electric power load, an exhaust heat from the gas turbine also increases, so that an output of the heat-driven refrigerating machine (ammonia absorption refrigerating machine) which is driven by using the exhaust heat of the gas turbine becomes excessive. On the other hand, when the electric power load decreases or when load of an air conditioner increases, the exhaust heat of the gas turbine relatively decreases since the output of the gas turbine is regulated by the electric power load, so that capacity of the heat-driven refrigerating machine becomes insufficient and cannot meet a load requirement of the air conditioner.

Also, in the ammonia absorption refrigerating machine, if high-temperature exhaust heat is used, pressure in a regenerator increases, so that a double-effect cycle cannot be made up. Therefore, a coefficient of performance of the refrigerating machine cannot be increased. If a water-lithium bromide based absorption refrigerating machine is used, evaporating temperature cannot be made 0° C. and lower, so that ice thermal storage cannot be accomplished, and thus the size of the thermal storage tank increases.

Further, if the temperature of the exhaust heat is decreased so as to increase efficiency of the gas turbine, the absorption refrigerating machine cannot be operated, so that cooling operation of the air conditioner cannot be performed.

SUMMARY OF THE INVENTION

An objects of the present invention is to solve the above problems, and is to provide a cogeneration system which properly copes with a variation in the electric power load and the load of an air conditioner, dissolves supply-demand unbalance between heat and electric energy, and improves thermal efficiency of the system. The present invention is to solve at least one of the above-described problems.

To achieve the above object, the present invention provides a cogeneration system in which exhaust heat of a gas turbine for driving a generator is recovered and cold is generated by driving a refrigerating machine with the recovered exhaust heat, and the cold is used for cooling intake air for the gas turbine and as a cold source for an air conditioner, wherein the system comprises a thermal storage tank for storing the cold generated by the refrigerating machine and electric energy storage equipment for storing electric energy generated by the generator; and cooling of the intake air for the gas turbine, the thermal storage, and the electric energy storage are controlled in relation to the load of the air conditioner and the electric power load of the generator.

Thereupon, in the case where the electric power load increases and thus the output of gas turbine must be increased, when the load of the air conditioner is low, the intake air for the gas turbine is cooled by the cold of the refrigerating machine to increase the output of the turbine, and when the exhaust heat is in surplus, the surplus refrigeration capacity of the refrigerating machine can be stored in the thermal storage tank. Accordingly, when the electric power is in surplus, it is possible to store the surplus electric power in the electric energy storage equipment without decreasing the output of the gas turbine, and it is possible to cope with the load of the air conditioner without decrement of the capacity of the refrigerating machine. Thus, it is possible to properly cope with a variation in the electric power load and the load of the air conditioner, to dissolve the supply-demand unbalance between the heat and the electric energy and to improve the thermal efficiency of the system.

Also, the present invention provides a cogeneration system in which a refrigerating machine is driven by using exhaust heat of a gas turbine generator, and cold generated by the refrigerating machine is used for cooling intake air for the gas turbine generator and as a cold source for an air conditioner, wherein the system comprises a thermal storage tank for storing the cold generated by the refrigerating machine and an electric energy storage equipment for storing electric energy generated by the gas turbine generator; the electric power load of the gas turbine generator and the load of the air conditioner are detected; when it is judged that the capacity of the gas turbine generator is insufficient and the capacity of the air conditioner is in surplus, the intake air cooling is performed and the thermal storage and electric energy storage are stopped; when it is judged that the capacity of the air conditioner is insufficient and the capacity of the gas turbine generator is in surplus, the electric energy storage is accomplished and the intake air cooling and thermal storage are stopped; when it is judged that the capacities of both of the air conditioner and the gas turbine generator are in surplus, the thermal storage and electric energy storage are accomplished and the intake air cooling is stopped; and when it is judged that the capacities of both of the air conditioner and the gas turbine generator are insufficient, the thermal storage and electric energy storage are stopped and the intake air cooling is performed by using the stored heat.

Further, in the present invention, it is preferable that heat exchange between chilled water cooled by the refrigerating machine and the intake air for the gas turbine is effected by a water-air heat exchanger.

Further, in the present invention, it is preferable that the chilled water cooled by the refrigerating machine is sprayed to thereby cool the intake air of the gas turbine.

Further, in the present invention, the refrigerating machine is preferably a water-lithium bromide based absorption refrigerating machine. Thereby, a double-effect cycle can be made up, so that the coefficient of performance of the refrigerating machine can be increased.

Further, in the present invention, the refrigerating machine is preferably an adsorption refrigerating machine using an adsorbent which can be regenerated. Thereby, even if the efficiency of the gas turbine is improved and thus the temperature of the exhaust heat is lowered, the refrigerating machine can be operated, so that the cooling operation of the air conditioner can be performed.

Further, in the present invention, it is preferable that the refrigerating machine comprises an absorption refrigerating machine and an adsorption refrigerating machine driven by the exhaust heat which has driven the absorption refrigerating machine.

Further, in the present invention, it is preferable that the thermal storage using the refrigerating machine is accomplished by using a latent thermal storage medium having a melting temperature of 0° C. or higher. Thereby, the thermal storage tank can be made small in size.

DESCRIPTION OF THE INVENTION

One embodiment of the present invention will be described with reference to the accompanying drawings.

Figure 1:
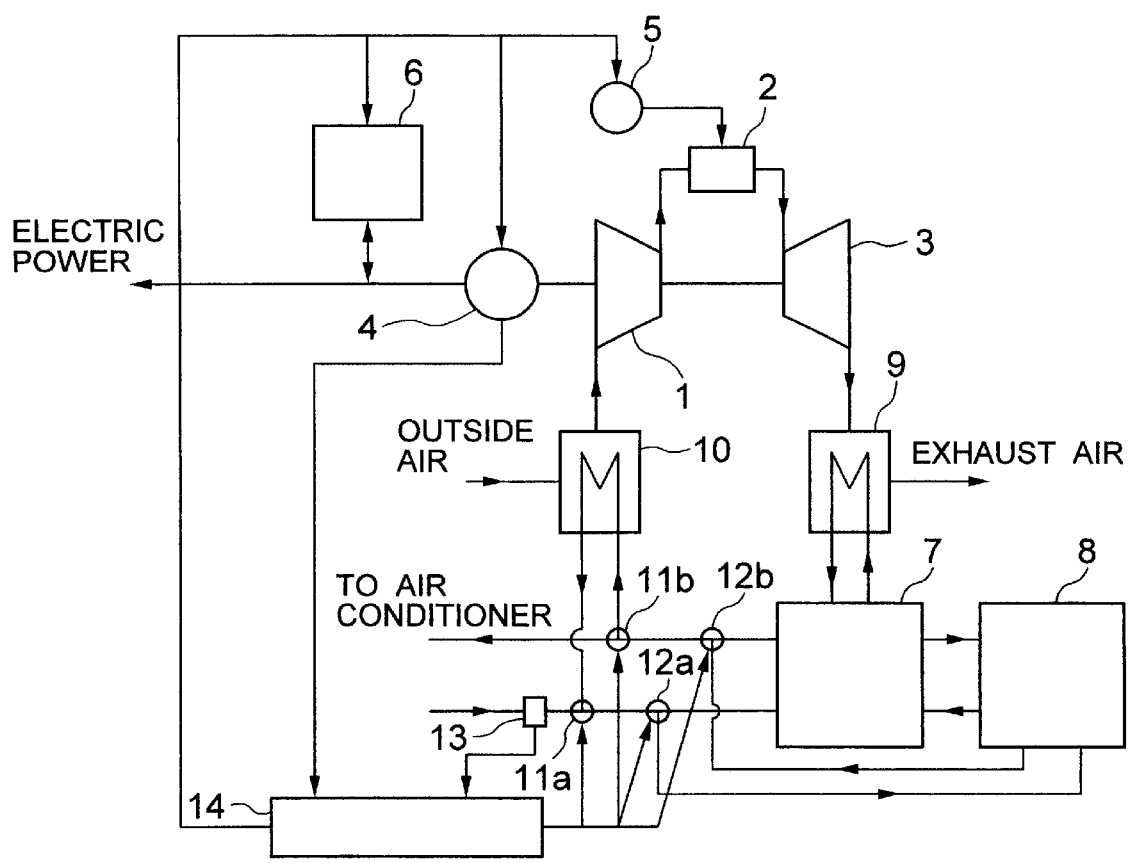
FIG. 1 is a block diagram of a cogeneration system in accordance with one embodiment of the present invention.

FIG. 1 shows a cogeneration system in accordance with one embodiment. In this cogeneration system, an outside air cooled by an intake air cooler is compressed and pressurized by a compressor 1, and then is fed into a combustor 2. In the combustor 2, a fuel supplied from a fuel supply system 5 is mixed with the high-pressurized air and is burned to turn into a high-pressure and high-temperature gas. The high-pressure and high-temperature gas causes a turbine 3 to rotate when it expands in the turbine 3, by which the compressor 1 and a generator 4 are driven. Exhaust gas discharged from the turbine 3, which has a temperature of about 500° C. to 600° C., is released to the atmosphere after heat is recovered by an exhaust heat recovery heat exchanger 9. The heat recovered by the exhaust heat recovery heat exchanger 9 is used as a driving heat source for a heat-driven refrigerating machine 7 to generate cold.

The cold generated by the heat-driven regenerating machine 7 is fed to an air conditioner (not shown) as chilled water to be used for cooling, or is fed to the intake air cooler 10 to cool the intake air for the gas turbine, or is stored in a thermal storage tank 8 by switching three-way valves 11a and 11b, and 12a and 12b according to the load of the air conditioner and the electric power load of the generator 4. Also, the electric power generated by the generator 4 is stored in an electric energy storage equipment 6 depending on condition of the electric power load.

The above-described switching of the operation is performed by the procedure described below according to the electric power load and the load of the air conditioner given in Table 1.

TABLE 1

| Operation pattern | | | | |
|---|---|---|---|---|
| Power generation capacity | Refrigeration capacity | Intake air cooling | Heat storage operation | Electric energy storage operation |
| Insufficient | Surplus | Performed | Stopped | Stopped |
| Surplus | Insufficient | Stopped | Stopped | Performed |
| Surplus | Surplus | Stopped | Performed | Performed |
| Insufficient | Insufficient | Use of stored heat | Stopped | Stopped |

When the electric power load increases and thus the electric power generation capacity (driving power of the turbine) becomes insufficient, rotational speed of the generator 4 decreases. In this case, a controller 14 detects decrease in the rotational speed and gives a signal for increasing a supply amount of fuel to the fuel supply system 5. The condition of the electric power load is measured by detecting the rotational speed of the generator 4 and by using a signal generated from the controller 14 at the detected rotational speed. The condition of the load of the air conditioner is judged from the temperature of the chilled water returned from the air conditioner, which is detected by a temperature sensor 13.

In the case where the chilled water temperature detected by the temperature sensor 13 is lower than a predetermined value (for example, 12° C.) when the rotational speed of the generator 4 decreases, the heat-driven refrigerating machine 7 has a surplus refrigeration capacity, and therefore, the three-way valves 11a and 11b are adjusted to increase flow rate of the chilled water circulating to the intake air cooler 10 to thereby increase the output of the gas turbine. At this time, the thermal storage operation and the electric energy storage operation are stopped.

On the other hand, in the case where the electric power load decreases and the load of the air conditioner increases, that is, the temperature of the return chilled water, which is detected by the temperature sensor 13, increases, the three-way valves 11a and 11b are set so that the chilled water circulates to the air conditioner, by which both of the intake air cooling operation and the thermal storage operation are stopped. At this time, if the fuel supplied to the fuel supply system 5 is decreased and thus the output of the turbine 3 is decreased, an amount of the exhaust heat of the turbine 3 decreases, so that the refrigeration capacity of the heat-driven refrigerating machine 7 decreases, and thus it is not possible to cope with the increase in the load of the air conditioner. Therefore, the controller 14 gives a signal for maintaining the fuel supply amount to the fuel supply system 5, and gives a signal for storing surplus electric power to the electric energy storage equipment 6.

In the case where both of the electric power generation capacity and the refrigeration capacity of the heat-driven refrigerating machine 7 have a margin in comparison with the electric power load and the load of the air conditioner, the intake air cooling operation is stopped, and the thermal storage operation and the electric energy storage operation are performed. Also, in the case where both of the power generation capacity and the refrigeration capacity are insufficient in comparison with the electric power load and the load of the air conditioner, the thermal storage operation and the electric energy storage operation are stopped, and the three-way valves 12a and 12b are adjusted to circulate the chilled water to the thermal storage tank 8, by which the chilled water is used for intake air cooling and the cooling operation of the air conditioner.

Thus, in the case where the electric power load increases and thus the output of the gas turbine must be increased, if the load of the air conditioner is small, the intake air for the gas turbine is cooled by the cold of the heat-driven refrigerating machine to increase the output of the turbine, and if the exhaust heat is in surplus, the surplus refrigeration capacity of the heat-driven refrigerating machine can be stored in the thermal storage tank. If the electric power is in surplus, the surplus electric power is stored in the electric energy storage equipment without decreasing the output of the gas turbine, so that the capacity of the heat-driven refrigerating machine does not decrease, and thus it is possible to cope with the load requirement of the air conditioner. In the case where the electric power is in surplus as well, the partial load operation of the gas turbine is not performed, so that the electric power generating efficiency of the gas turbine is not decreased.

Figure 2:
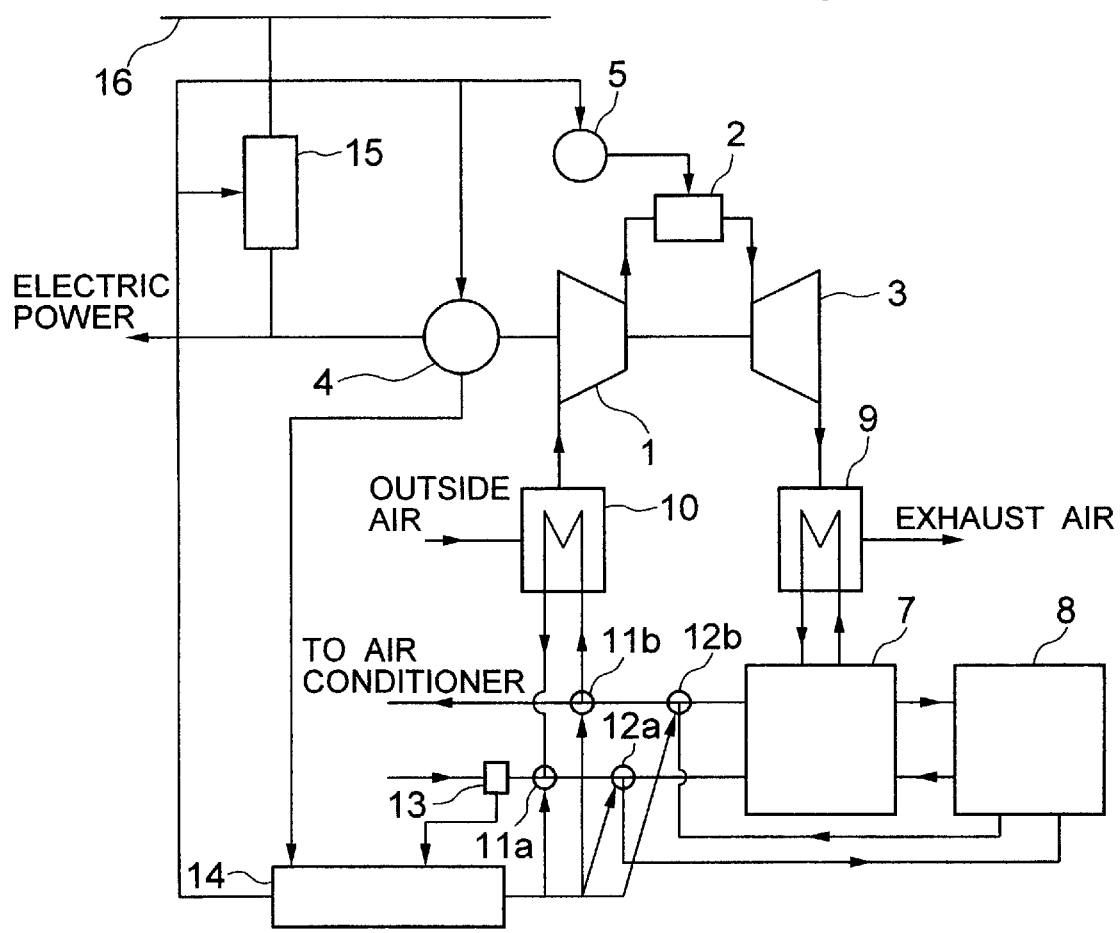
FIG. 2 is a block diagram of a cogeneration system in accordance with another embodiment of the present invention.

FIG. 2 shows another embodiment of a cogeneration system. In comparison with the cogeneration system shown in FIG. 1, the system shown in FIG. 2 is configured so that system interconnection operation with an electric power system 16 can be performed by using a system interconnection controller 15 comprising an inverter, a protection circuit, and the like. According to this embodiment, it becomes possible to buy the electric power from the electric power system 16 when the electric power generation capacity is insufficient and to sell the electric power by an inverse flow to the electric power system 16 when the electric power generation capacity is in surplus. Therefore, the shortage in the electric power and the increase in electric power purchase cost can be prevented.

Figure 3:
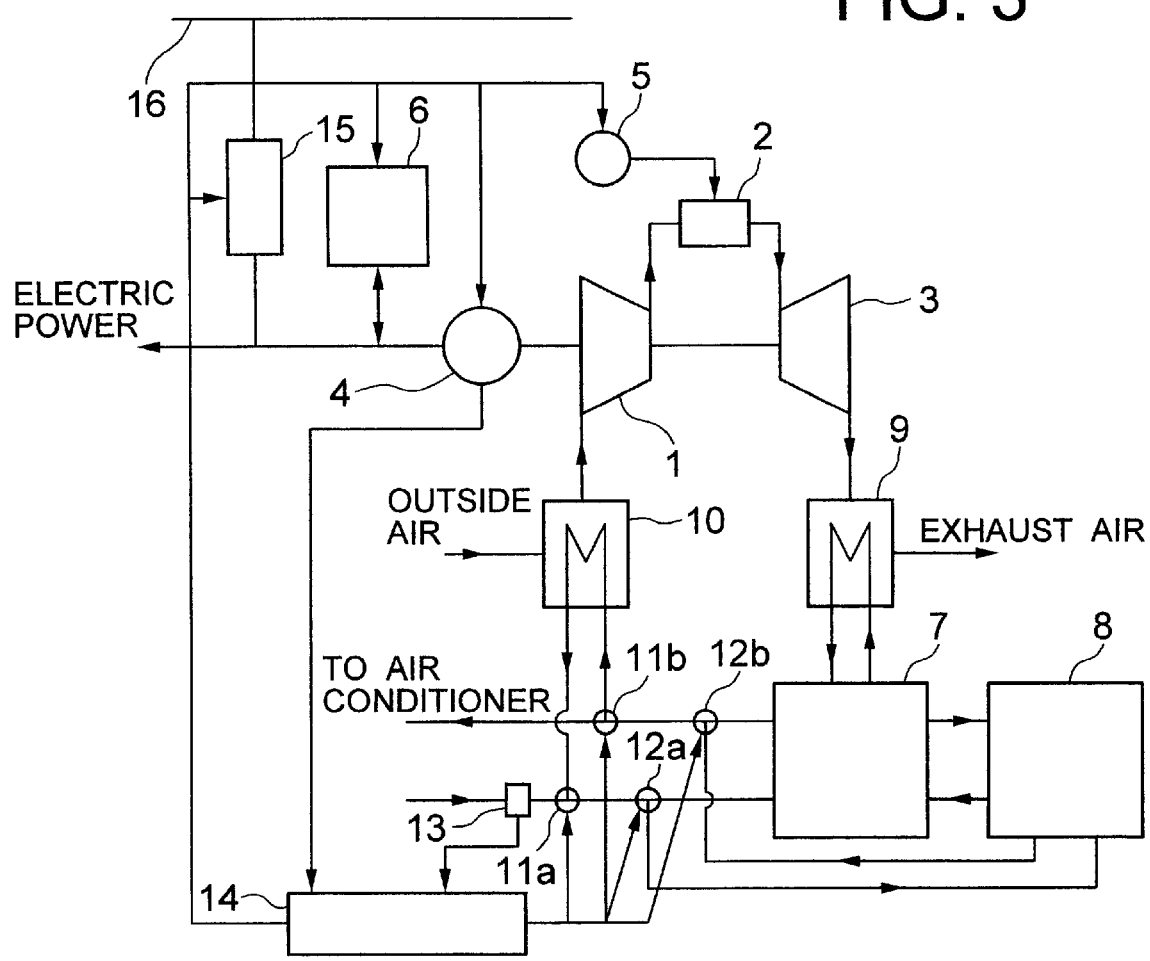
FIG. 3 is a block diagram of a cogeneration system in accordance with still another embodiment of the present invention.

FIG. 3 shows still another embodiment of a cogeneration system. In comparison with the cogeneration system shown in FIG. 2, the system shown in FIG. 3 is configured so that the electric energy storage equipment 6 is provided in addition to the system interconnection controller 15 to store surplus power, by which the surplus electric power is stored and load leveling of the electric power system 16 is performed.

Figure 4:
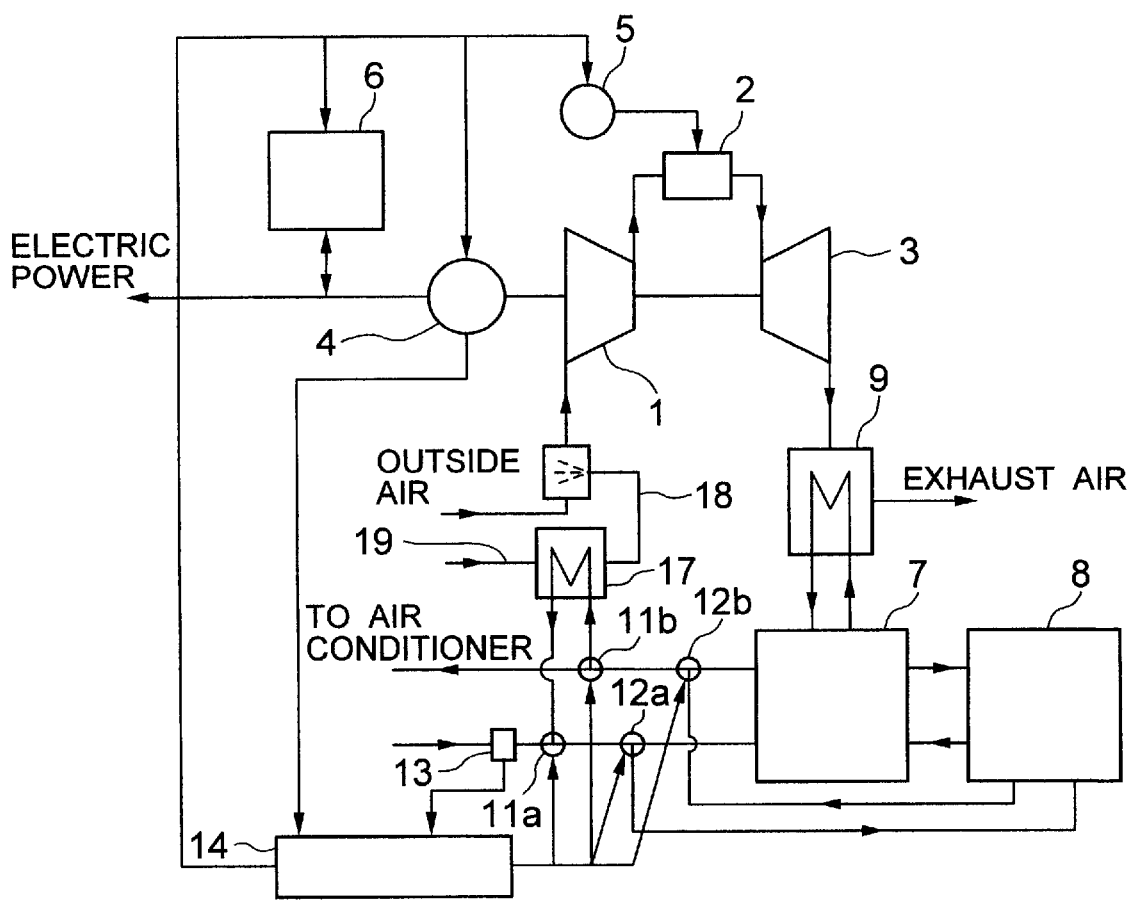
FIG. 4 is a block diagram of a cogeneration system in accordance with still another embodiment of the present invention.

FIG. 4 shows still another embodiment of a cogeneration system. In comparison with the cogeneration systems shown in FIGS. 1 to 3, the system shown in FIG. 4 is configured so that as an intake air cooling system for the gas turbine, cooling water 19 is sprayed to the intake air for the compressor 1. The cooling water 19 is cooled by the chilled water, which is supplied from the heat-driven refrigerating machine 7, in a cooling water cooler 17, and then sprayed to the intake air for the compressor 1 by using a cooling water injection circuit 18. According to this embodiment, a loss in suction pressure of the compressor 1, which is caused by the intake air cooler 10, can be eliminated, so that the efficiency of the gas turbine can be improved.

Figure 5:
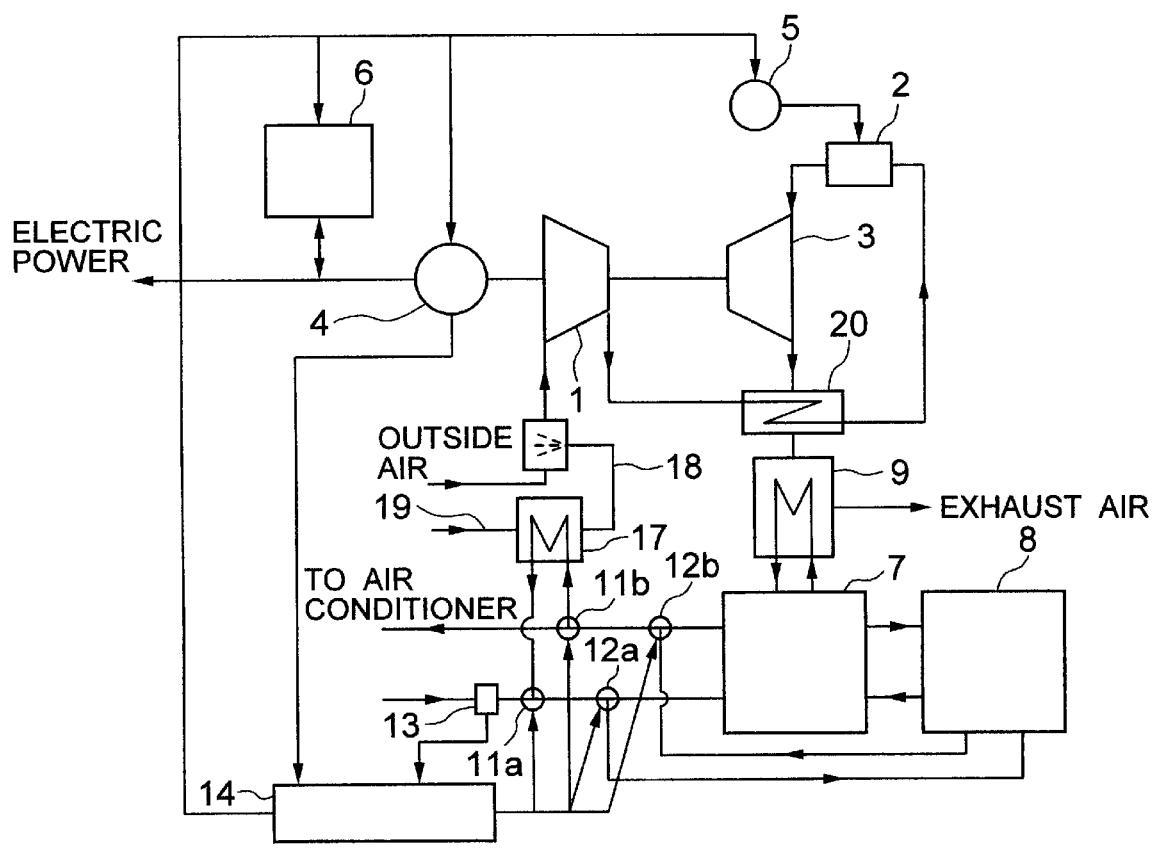
FIG. 5 is a block diagram of a cogeneration system in accordance with still another embodiment of the present invention.

FIG. 5 shows still another embodiment of a cogeneration system, in which after the heat exchange is effected between the exhaust gas of the turbine 3 and the air coming out of the compressor 1 by a recuperator 20, the air is caused to flow into the combustor 2. According to this embodiment, the exhaust heat of the turbine 3 can be recovered for the gas turbine cycle, so that the efficiency of the electric power generation can further be improved.

Figure 6:
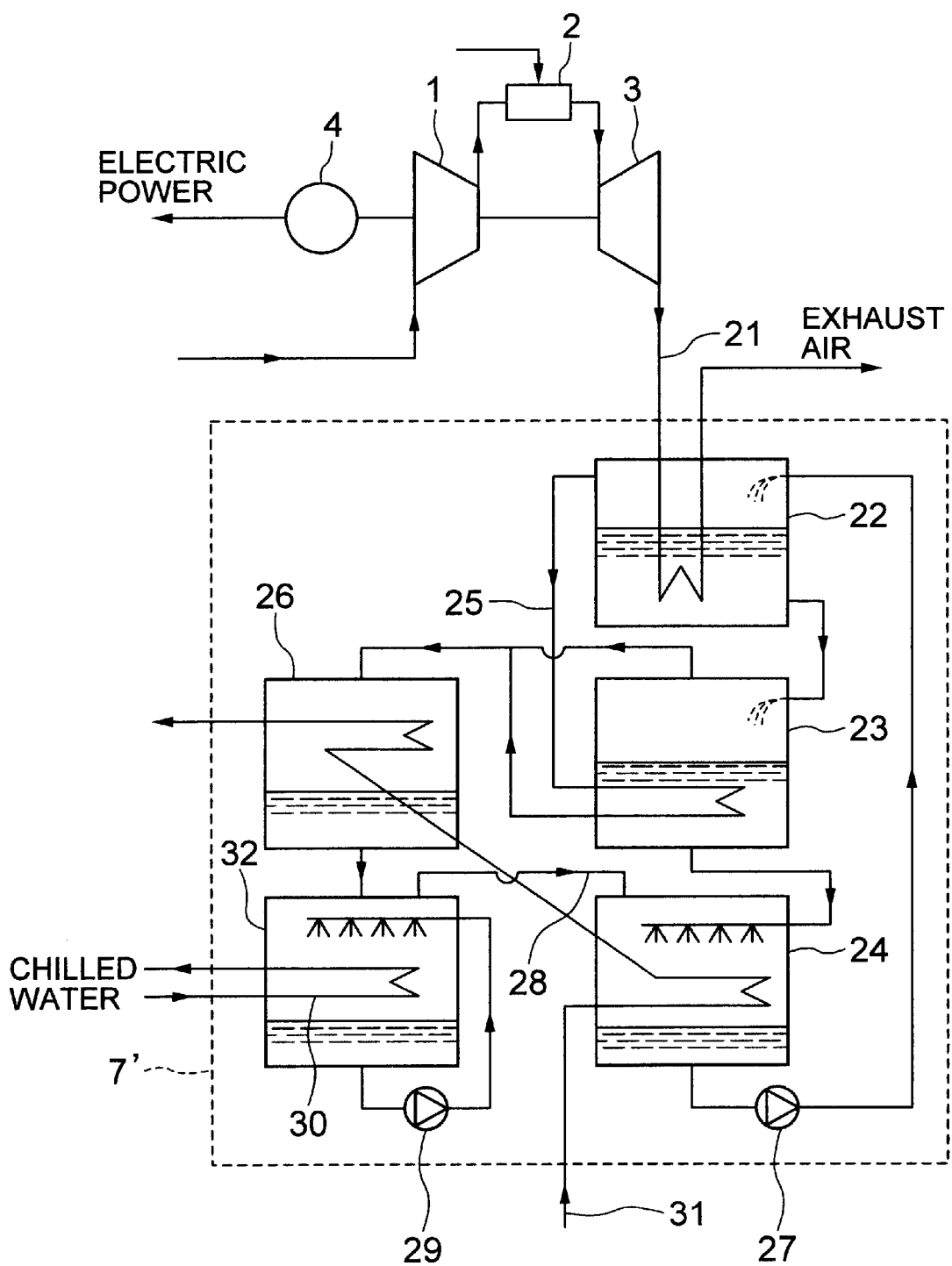
FIG. 6 is a block diagram showing a case where an absorption refrigerating machine is used as a refrigerating machine (heat-driven refrigerating machine)

FIG. 6 shows an example in which a water-lithium bromide based absorption refrigerating machine is used as the refrigerating machine (heat-driven refrigerating machine) 7.

High-temperature exhaust heat 21 discharged from the turbine 3 is introduced into a high-temperature regenerator 22 of a double-effect water-lithium bromide based absorption refrigerating machine 7', and condenses a weak solution which is diluted by absorbing water vapor in an absorber 24 and is transferred by a solution pump 27. The solution condensed by the high-temperature regenerator 22 is heated into a strong solution by high-temperature water vapor 25, which is generated in the high-temperature regenerator 22, in a low-temperature regenerator 23, and is sprayed into the absorber 24. The water vapor generated in the low-temperature regenerator 23 and the water vapor having heated the solution in the low-temperature regenerator 23 are cooled into water by cooling water 31 in a condenser 26. The water evaporates while being sprayed on a tube 30 by using a recirculating pump 29 in an evaporator 32, and cools chilled water flowing in the tube 30. The water having evaporated in the evaporator 32 turns into water vapor 28 and is absorbed by the strong solution in the absorber 24.

If the water-lithium bromide based absorption refrigerating machine 7' is used as a refrigerating machine (heat-driven refrigerating machine), a double-effect absorption cycle, in which the heat of the high-temperature water vapor 25 obtained by condensing the solution by the high-temperature regenerator 22 is further used in the low-temperature regenerator 23, can be made up. Therefore, the coefficient of performance of the heat-driven refrigerating machine 7 can be increased.

Figure 7:
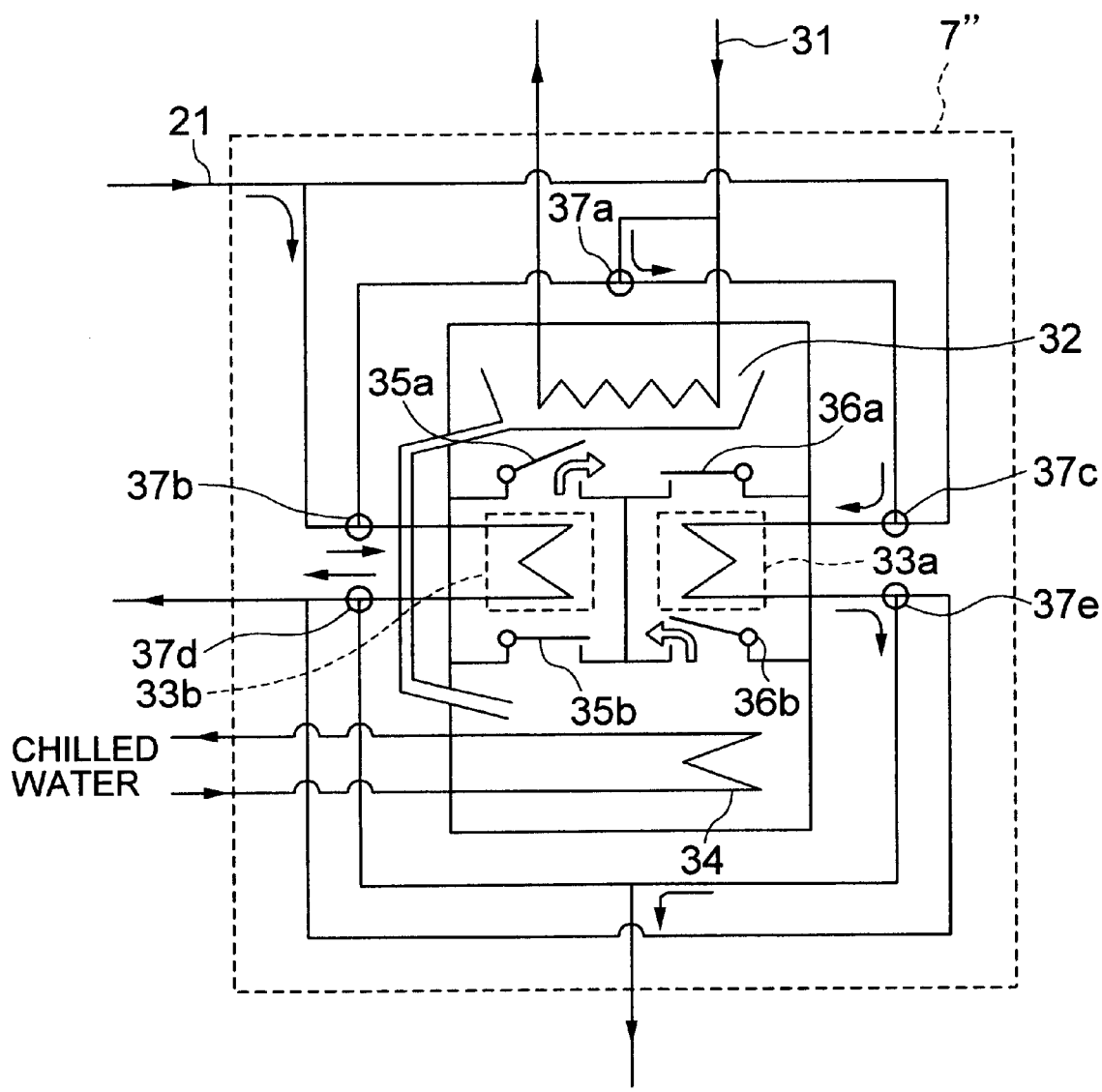
FIG. 7 is a block diagram showing a case where an adsorption refrigerating machine is used as a refrigerating machine (heat-driven refrigerating machine)

FIG. 7 shows an example in which an adsorption refrigerating machine 7" using an adsorbent which can be regenerated is used as the heat-driven refrigerating machine 7. In the adsorption refrigerating machine 7", the exhaust heat 21 of the gas turbine heats an adsorbent such as silica gel and zeolite in an adsorbent heat exchanger 33b to desorb the adsorbed water vapor. The desorbed water vapor flows into a condenser 32 after passing through an opened damper 35a, and is cooled into water by the cooling water 31. This water evaporates on an evaporating tube 34 to cool the chilled water. The water having evaporated on the evaporating tube 34 passes through an opened damper 36b and is adsorbed by an adsorbent heat exchanger 33a. In the case where the adsorbent in the adsorbent heat exchanger 33a adsorbs water, thereby decreasing the adsorbing ability, three-way valves 37a, 37b, 37c and 37d are switched to cause the exhaust heat 21 to flow into the adsorbent heat exchanger 33a and to cause the cooling water 31 to flow into the adsorbent heat exchanger 33b, by which the adsorbent in the adsorbent heat exchanger 33a is regenerated. At this time, the dampers 35*a* and 36*b* are closed, and dampers 36*a* and 35*b* are opened.

The adsorption refrigerating machine 7″ can be operated even when the temperature of the exhaust heat 21 is about 70° C. Therefore, the heat-driven refrigerating machine 7 can be operated even by using the exhaust heat with a relatively low temperature coming out of the recuperator 20 shown in FIG. 5.

Figure 8:
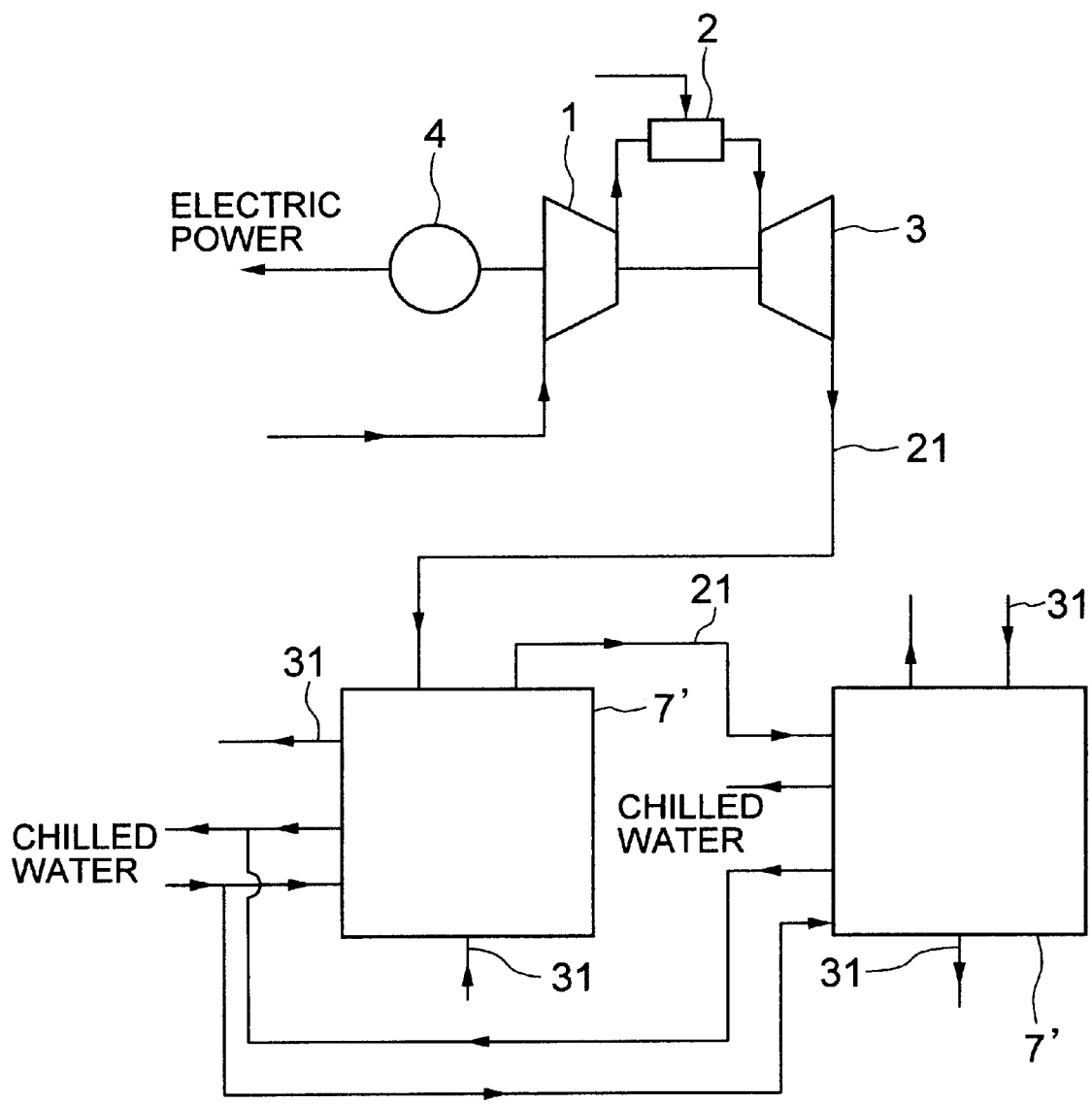
FIG. 8 is a block diagram showing a case where an absorption refrigerating machine and an adsorption refrigerating machine are cascade connected as a refrigerating machine (heat-driven refrigerating machine)

FIG. 8 shows an example in which the double-effect water-lithium bromide based absorption refrigerating machine 7′ and the adsorption refrigerating machine 7″ which are cascade connected to each other are used as a heat-driven refrigerating machine 7. In this example, after driving the double-effect water-lithium bromide based absorption refrigerating machine 7′, the exhaust heat 21 of the turbine 3 can drive the adsorption refrigerating machine 7″. Therefore, the exhaust heat 21 can be used more effectively, and thus the thermal efficiency of cogeneration system can be improved.

Figure 9:
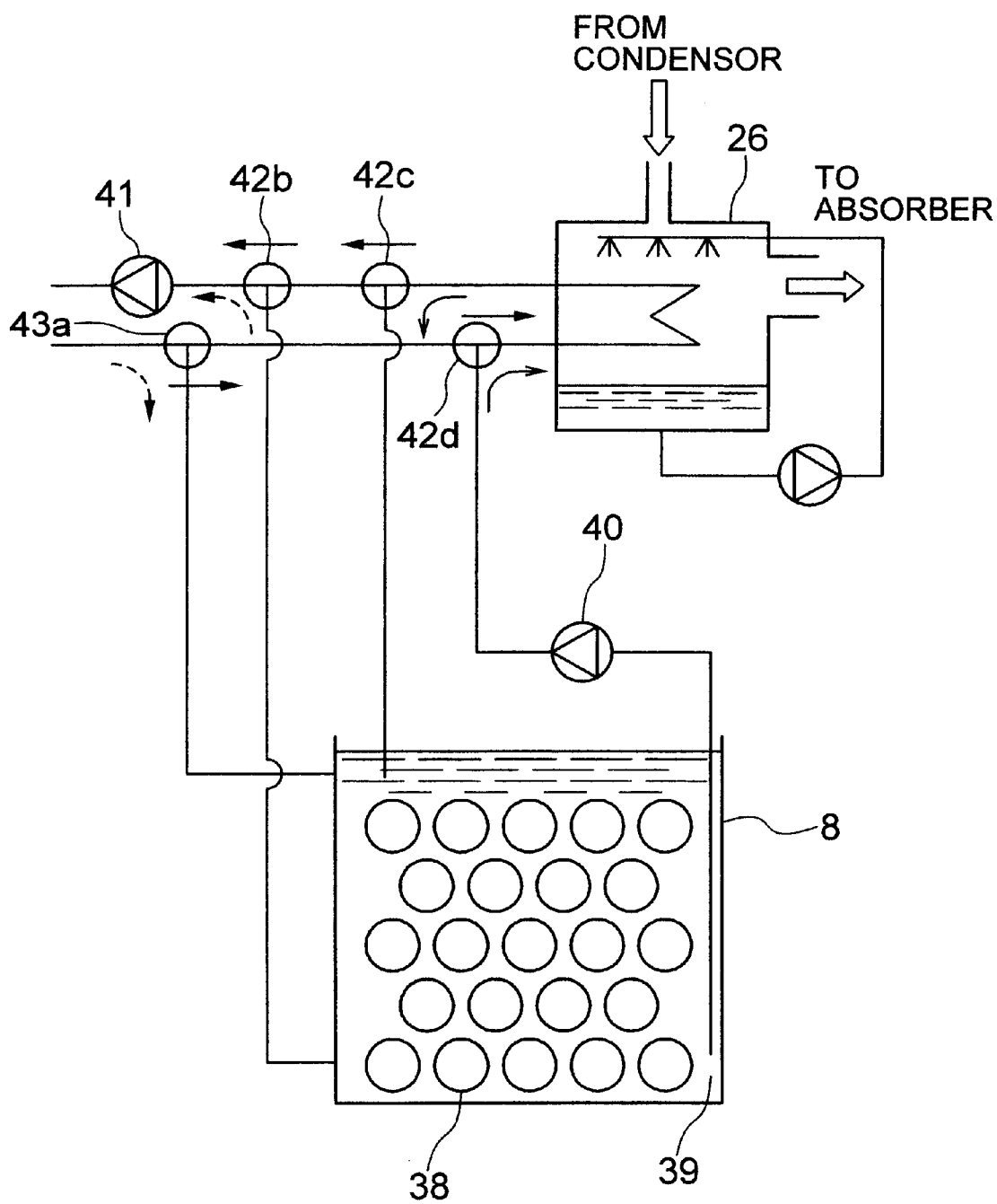
FIG. 9 is a block diagram showing a case where a latent thermal storage medium is used in a thermal storage tank.

FIG. 9 shows an example in which a latent thermal storage medium having a melting temperature of 0° C. or higher is used in a thermal storage tank of a cogeneration system. In this example, the thermal storage tank 8 is filled with chilled water 39 in which capsules 38, each of which is filled with a latent thermal storage medium such as hexanediol having a melting temperature of 0° C. or higher, are put. At the time of thermal storage operation, three-way valves 42*c* and 42*d* are set in a direction such that chilled water circulates between the thermal storage tank 8 and the evaporator 26, and a cooling water pump 40 is operated. The chilled water 39 is cooled by the evaporator 26, and cools and coagulates the latent thermal storage medium in the capsule 38. When the operation is performed using only the thermal storage tank 8, three-way valves 42*a* and 42*b* are set in a direction such that chilled water circulates between the intake air cooler 10 or the air conditioner and the thermal storage tank 8, and a chilled water circulating pump 41 is operated. The returned chilled water of which temperature is increased by the cooling load such as the intake air cooler 10 or the air conditioner melts the latent thermal storage medium in the capsule 38, and is cooled and circulates again to the cooling load. When the thermal storage operation is not performed, the three-way valves 42*a*, 42*b*, 42*c* and 42*d* are set in a direction such that the cooling load and the evaporator 26 are connected directly. If the operation is performed by setting the three-way valves 42*a* and 42*d* in a directions of being connected to the thermal storage tank 26, by setting the three-way valves 42*b* and 42*c* in a direction of being connected to the cooling load, and by operating the chilled water pump 40 and the chilled water circulating pump 41, the chilled water returned from the cooling load passes through the three-way valve 42*a*, circulates in the thermal storage tank 8, and circulates to the cooling load after passing through the three-way valve 42*d*, the evaporator 26, and the three-way valves 42*c* and 42*b*. Therefore, it becomes possible to perform follow-up operation when an amount of stored heat falls short.

Figure 10:
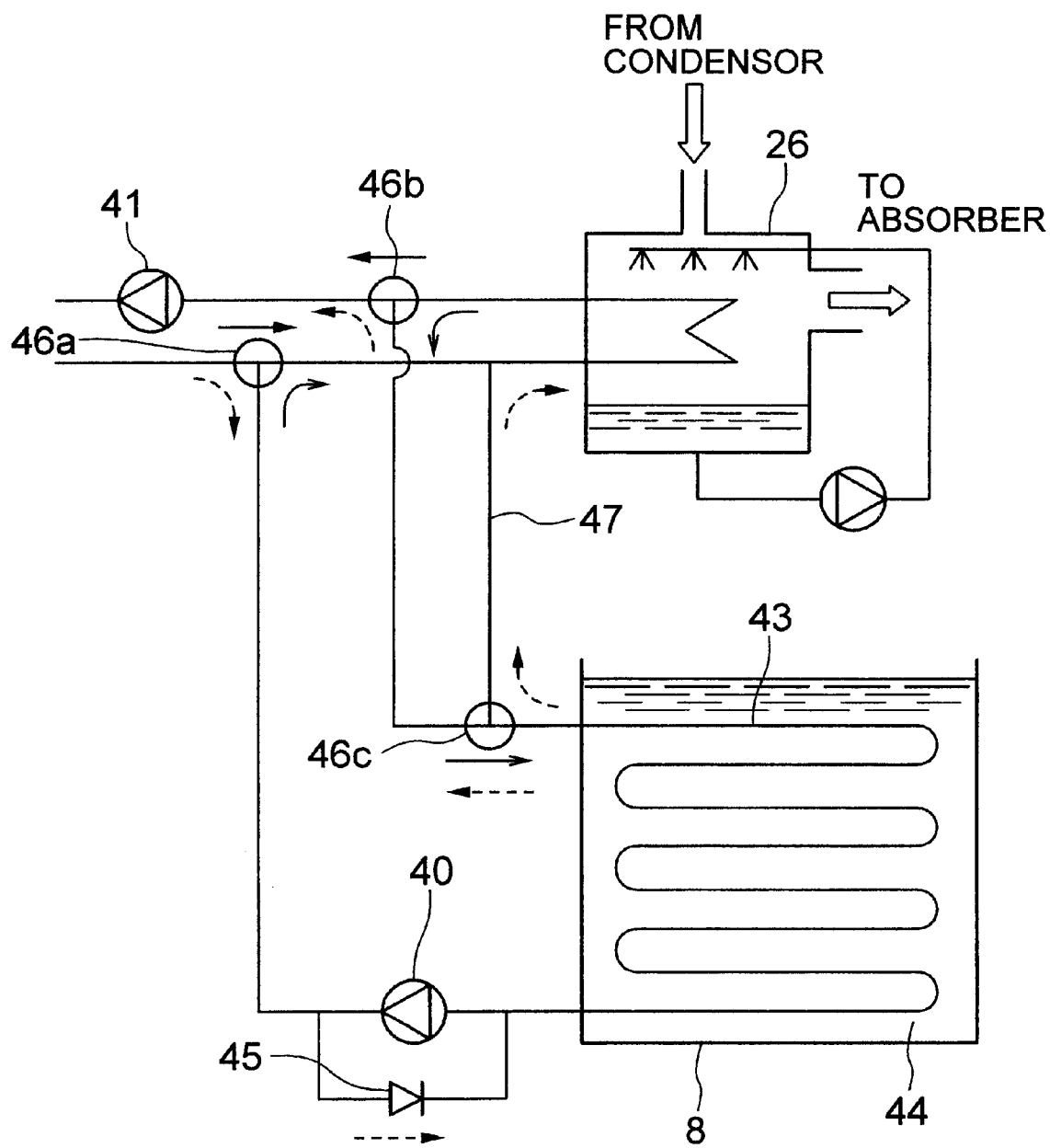
FIG. 10 is a block diagram of a thermal storage tank.

FIG. 10 shows another embodiment in which a latent thermal storage medium having a melting temperature of 0° C. or higher is used in a thermal storage tank. In this embodiment, the thermal storage tank 8 is filled with the latent thermal storage medium, and a thermal storage heat exchanger 43 is provided in the thermal storage tank 8. At the time of thermal storage operation, three-way valves 46*a*, 46*b* and 46*c* are set so that chilled water circulates between the thermal storage heat exchanger 43 and the evaporator 26, and the chilled water pump 40 is operated, by which a latent thermal storage medium 44 coagulates and grows around the thermal storage heat exchanger 43. When the operation is performed using only the thermal storage tank 8, the three-way valves 46*a*, 46*c* and 46*b* are set in a direction such that chilled water circulates between the cooling load and the thermal storage tank 8, and the chilled water circulating pump 41 is operated. At this time, the chilled water returned from the cooling load passes through a check valve 45, and circulates in the thermal storage heat exchanger 43. Also, when the follow-up operation is performed by using the evaporator 26, the three-way valve 46*c* is set in the direction of bypass 47, and the three-way valve 46*b* is set in the direction of the cooling load.

Figure 11:
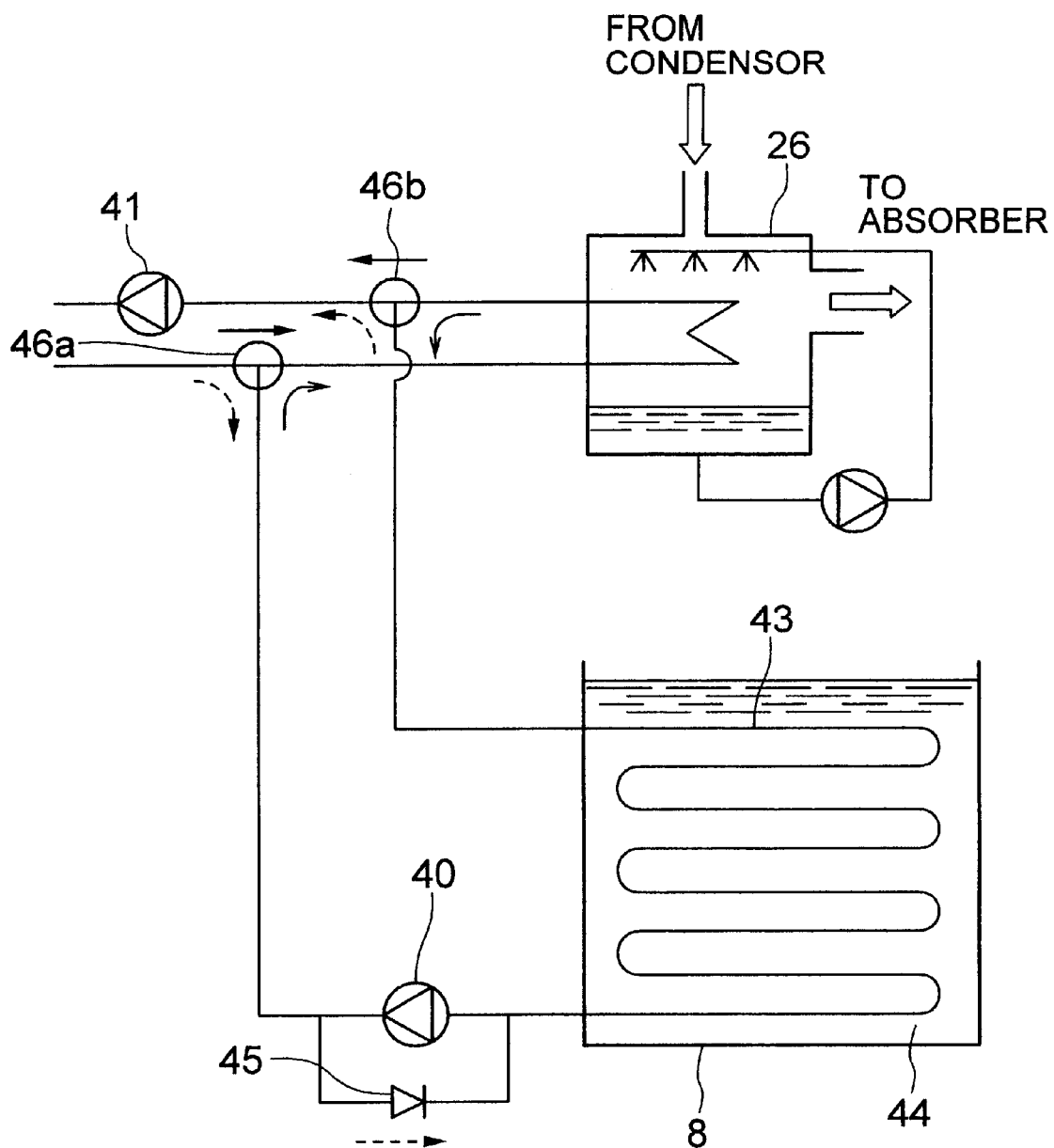
FIG. 11 is a block diagram of a thermal storage tank.

FIG. 11 shows an example in which a latent thermal storage medium having a melting temperature of 0° C. or higher is used in a thermal storage tank. In this example, the three-way valve 46*c* and the bypass 47 are not provided. Thereupon, the follow-up operation using the evaporator 26 cannot be performed at the time of operation using the thermal storage tank, but the system configuration can be simplified, and the system cost can be reduced.

The present invention provides a cogeneration system that can properly cope with the electric power load and the load of the air conditioner.

It will be further understood by those skilled in the art that the foregoing description has been made on embodiments of the invention and that various changes and modifications may be made in the invention without departing from the spirit of the invention and scope of the appended claims.

What is claimed is:

1. A cogeneration system in which cold is generated by recovering exhaust heat of a gas turbine for driving a generator to drive a refrigerating machine, and the cold is used for cooling intake air for said gas turbine and as a cold heat source for an air conditioner, wherein said system comprises a thermal storage tank for storing the cold generated by said refrigerating machine and an electric energy storage equipment for storing electric energy generated by said generator; and cooling of the intake air for said gas turbine, thermal storage, and electric energy storage are controlled in relation to the load of said air conditioner and the electric power load of said generator.

2. The cogeneration system according to claim 1, wherein heat exchange between chilled water cooled by said refrigerating machine and intake air for the gas turbine is effected by a water-air heat exchanger.

3. The cogeneration system according to claim 1, wherein chilled water cooled by said refrigerating machine is sprayed to thereby cool intake air of said gas turbine.

4. The cogeneration system according to claim 1, wherein said refrigerating machine comprises a water-lithium bromide based absorption refrigerating machine.

5. The cogeneration system according to claim 1, wherein said refrigerating machine comprises an adsorption refrigerating machine using an adsorbent which can be regenerated.

6. The cogeneration system according to claim 1, wherein said refrigerating machine comprises an absorption refrigerating machine and an adsorption refrigerating machine driven by exhaust heat which has driven said absorption refrigerating machine.

7. The cogeneration system according to claim 1, wherein thermal storage using said refrigerating machine is accomplished by using a latent thermal storage medium having a melting temperature of 0° C. or higher.

8. A cogeneration system in which a refrigerating machine is driven by using exhaust heat of a gas turbine generator, and cold generated by said refrigerating machine is used for cooling intake air for said gas turbine generator and as a cold source for an air conditioner, wherein said system comprises a thermal storage tank for storing the cold generated by said refrigerating machine and an electric energy storage equipment for storing electric energy generated by said gas turbine generator;

an electric power load of said gas turbine generator and a load of said air conditioner are detected;

when it is judged that the capacity of said gas turbine generator is insufficient and the capacity of said air conditioner is in surplus, said intake air cooling is performed and said thermal storage and electric energy storage are stopped;

when it is judged that the capacity of said air conditioner is insufficient and the capacity of said gas turbine generator is in surplus, said electric energy storage is performed and said intake air cooling and thermal storage are stopped;

when it is judged that the capacities of both of said air conditioner and said gas turbine generator are in surplus, said thermal storage and electric energy storage are performed and said intake air cooling is stopped; and when it is judged that the capacities of both of said air conditioner and said gas turbine generator are insufficient, said thermal storage and electric energy storage are stopped, and said intake air cooling is performed by using stored heat.

9. The cogeneration system according to claim 8, wherein heat exchange between chilled water cooled by said refrigerating machine and intake air for the gas turbine is effected by a water-air heat exchanger.

10. The cogeneration system according to claim 8, wherein chilled water cooled by said refrigerating machine is sprayed to thereby cool intake air of said gas turbine.

11. The cogeneration system according to claim 8, wherein said refrigerating machine comprises a water-lithium bromide based absorption refrigerating machine.

12. The cogeneration system according to claim 8, wherein said refrigerating machine comprises an adsorption refrigerating machine using an adsorbent which can be regenerated.

13. The cogeneration system according to claim 8, wherein said refrigerating machine comprises an absorption refrigerating machine and an adsorption refrigerating machine driven by exhaust heat which has driven said absorption refrigerating machine.

14. The cogeneration system according to claim 8, wherein thermal storage using said refrigerating machine is accomplished by using a latent thermal storage medium having a melting temperature of 0° C. or higher.

* * * * *